Patented Oct. 9, 1928.

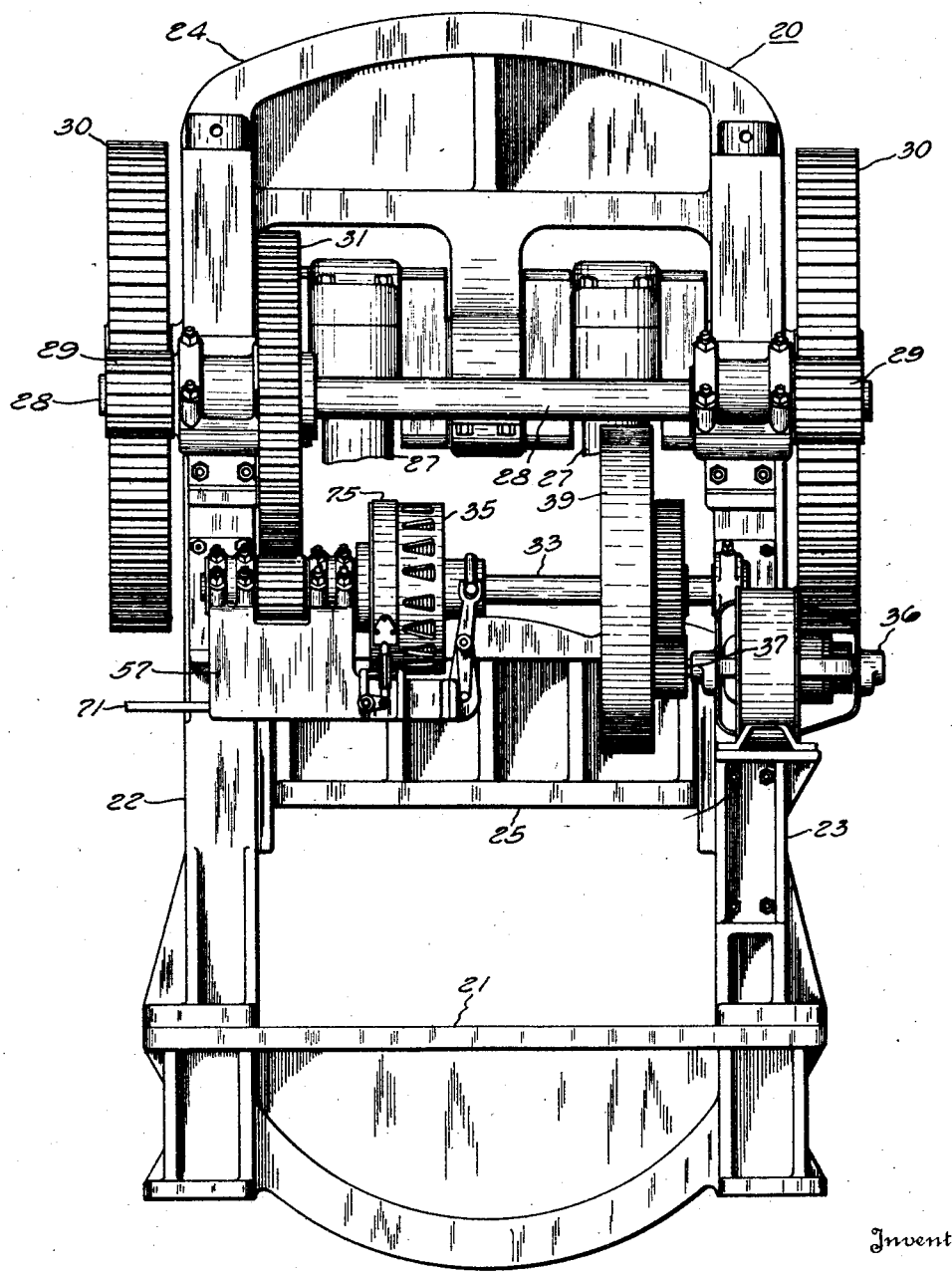

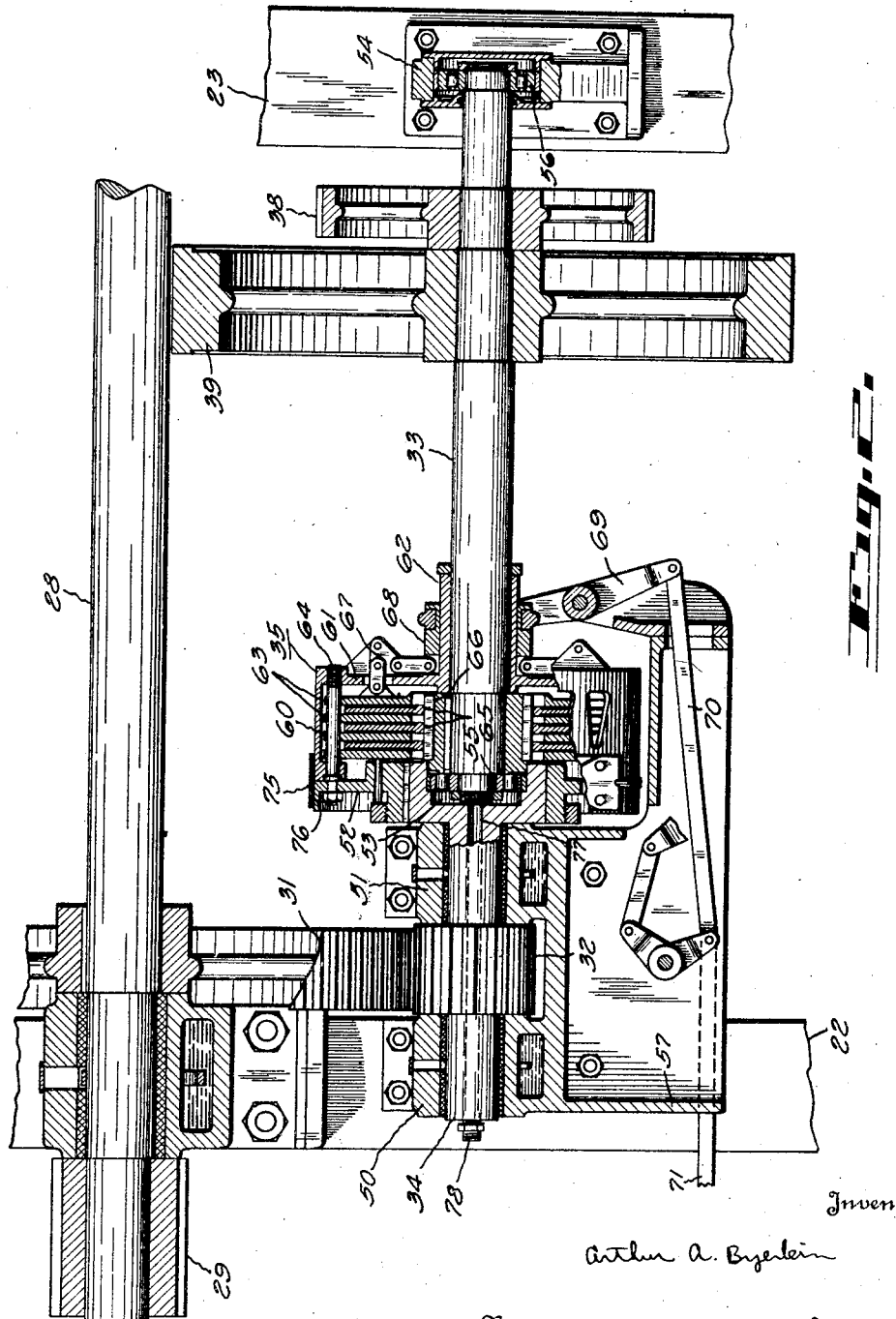

1,686,844

UNITED STATES PATENT OFFICE.

ARTHUR A. BYERLEIN, OF DETROIT, MICHIGAN.

STAMPING PRESS.

Application filed July 20, 1925. Serial No. 44,793.

The present invention relates to apparatus for working metal and more particularly to apparatus of the type known as a press.

One of the principal objects of the present invention is to provide an improved form of driving and control means for a press.

Another object is to provide a driving means in which the main drive pinion is mounted separately from the main driving shaft.

A further object is to provide a driving means having co-axial main driving and pinion shafts with interconnecting clutch means, the main operating members of the main clutch being unitary with the main driving shaft and removable as a unit therewith from the press.

Further objects and advantages of the invention will be apparent from the following description taken in connection with the accompanying drawing in which:

Fig. 1 is an elevation of a press embodying the present invention; and

Fig. 2 is a vertical longitudinal section through the main driving shaft and the main drive pinion showing details of construction of the present invention, parts being illustrated in elevation.

The present invention, while capable of numerous embodiments, is illustrated in a press 20, having a press frame consisting of a bed portion 21, upright side frame members 22 and 23, and an arch member 24. The side frame members 22 and 23 are provided with slide portions 24 receiving therebetween the plunger 25 which is adapted to be reciprocated or slid in the slide members 24.

The means for actuating or driving the plunger 25 comprises a crank shaft 26 journaled in the press frame, the crank shaft being connected with the plunger by means of the connecting rods 27, portions of which are broken away for clearness in illustration. The crank shaft 26 is driven from the driving shaft 28 through the pinions 29 and gears 30 keyed upon the outer ends of the driving shaft 28 and the crank shaft 26 respectively. The driving shaft 28 carries a gear wheel 31 which meshes with the main drive pinion 32 from which it is driven. The main driving shaft 33 is disposed in axial extension of the main drive pinion shaft 34 and may be operatively connected therewith through the medium of the clutch 35 which is carried by the shafts 33 and 34. A motor 36 mounted upon the side frame member 23, or other source of power, may be provided for driving the main drive shaft 33, the driving connection being illustrated at 37 and 38. The driving shaft 33 carries a fly wheel or momentum member 60 as shown at 39.

In the operation of the press, the motor 36 is adapted to maintain the main driving shaft 33 in continuous rotation. As the plunger 25 is intended to be operated only intermittently, the clutch 35 is provided to control the connection between the continuously moving driving shaft 33 and the shaft 34 of the main drive pinion 32 which transmits the power for actuating the plunger, through gear 31, shaft 28, pinion 29, to gears 30 on crank shaft 26, and from the latter through connecting rods 27 to the plunger 25. When the plunger 25 is not being operated, the main drive pinion 32, its shaft 34 and clutch parts carried thereby, and all driving connections between the drive pinion 32 and the plunger 25 are at rest.

The shaft 34 to which the main drive pinion 32 is keyed, which shaft is hereinafter sometimes referred to as the driven shaft, is journaled in the bearings 50 and 51 which are preferably formed in a single casting or bracket 57, which bracket may be rigidly secured to one side frame member 22. The inner end of the driven shaft 34 is provided with a disc-like enlargement 52 which is preferably integral with the driven shaft 34 and which constitutes one of the end walls of the clutch housing. The inner end of the driven shaft 34 is recessed at 53 to provide a bearing for the inner end of the driving shaft 33, the outer end of the driving shaft 33 being journaled in a bracket 54 which may be mounted upon the other side frame member 23, as best shown in Fig. 2, but which need not be constructed separately from the bracket 57, it being desirable in some instances, as in the case of a narrow press, to form these brackets as a single part which may be supported from one or both side frame members. The fly wheel 39 and gear wheel 38 are non-rotatably secured to the driving shaft 33 intermediate the bearings thereof. The bearings 53 and 54 are provided with anti-friction roller-bearing members 55 and 56 which are preferably of the type known as self aligning, that is, they are so constructed as to permit a true anti-friction rolling action irrespective of a slight non-parallelism of the parts carrying the roller-bearing members.

As already stated, the drive shaft 33 and driven shaft 34 may be operatively connected together through the medium of clutch 35. Said clutch comprises a clutch housing, consisting of a drum portion 60, an end wall 52 which, as already stated, is a disc-like enlargement on the driven shaft 34, and a second end wall 61 which is provided with a sleeve portion 62 surrounding the driving shaft 33 and serving as a guide and travel limiting stop for a collar 68. Within the clutch housing are disposed suitable friction members which may consist of a plurality of outer friction discs 63 non-rotatably mounted in the housing by means of pins 64, and inner friction-discs 65, keyed at 66 against rotation upon the driving shaft 33. As is well understood, clutches of the type disclosed may be caused to connect to power shafts or parts to which they are secured by compressing the friction-discs so that the hub and the housing portions of the clutch move in unison. Likewise the clutch is disengaged by releasing the pressure upon the discs so to permit relative rotational movement of one set of discs relative to the other. This control of the clutch is secured in the present instance through the medium of a suitable toggle linkage 67 which is mounted upon the end wall 61 of the housing and which includes a collar 68 mounted to slide longitudinally upon the sleeve 62. The clutch toggle or control 67 may be actuated by clutch actuating lever 69 one end of which is adapted to cooperate with the collar 68 to move the same longitudinally upon the sleeve 62 thereby effecting clutching and unclutching of the clutch 35. The clutch actuating lever 69 is connected through link 70 with the control rod or member 71 by which the operator may actuate the clutch control mechanism. A friction-brake 75 is mounted to cooperate with that portion of the drum 60 which is adjacent the disc or end wall 52 of the clutch housing, and this brake is also preferably connected with the control member 71 through suitable linkage whereby when the clutch is disconnected the brake is applied so as to bring the parts to rest quickly.

Referring to Fig. 2 it will be noted that the clutch housing is separable at the end wall 52. By removing the fastening means 76 upon the pin or bolt 64, the drum portion of the housing and the opposite end wall 61 which carry the friction-discs and the control mechanism are no longer rigidly secured to the end wall 52 but may be separated therefrom as a unit by withdrawing them to the right in a direction parallel with the axis of the pins or bolts 64. As a consequence of this construction it is possible merely by disconnecting the clutch control mechanism from the control lever 69, and by dismounting a portion of the bearing 54, to remove the driving shaft 33 from the press with the gear wheel 38, the flywheel 39 and the portions of the clutch housing to the right of the disc 52 mounted thereon, gear wheels 38, fly wheel 39 and clutch housing constituting a unit with the driving shaft. In this connection it will be observed that the outer friction-discs which are mounted in the clutch housing, the inner friction-discs which are mounted on the driving shaft, and the clutch operating mechanism mounted on the end wall 61 and sleeve 62 are also removed as a unit with the driving shaft 33. The removal of the parts of the drive shaft 33 with the parts mounted thereon does not in any way affect the mounting of the driven shaft 34 and the end wall or disc 52, nor does it affect the friction-brake 75 which remains in assembled position upon the circumference of the end wall 52.

The lubricant for the bearing 53 may be supplied through the conduit or passage 77 which extends longitudinally through the driven shaft 34, a suitable coupling 78 being provided at its outer end for connecting with a source of supply.

From the foregoing it will be apparent that the present invention provides an improved form of press actuating and control mechanism. Heretofore it has been the practice to journal the main driving shaft at both ends to the press frame and to mount the drive pinion thereon, a construction which has been attended with some difficulty in the lubrication of the drive pinion, owing to the fact that the main driving shaft is in continuous rotation and the drive pinion is not readily adapted to receive grease cups or other form of lubricating means. The present construction obviates this difficulty in removing the drive pinion from the main driving shaft and mounting the same in its own bearings which are secured to the press frame and which may be readily lubricated. This construction has the further advantage in that it removes from the main driving shaft the weight of the drive pinion and the friction thereof, thereby effecting a saving in the power required to maintain the main driving shaft 33 in continuous rotation.

The construction herein disclosed wherein one end of the main driving shaft 33 may be supported from the inner end of the driven shaft 34 is one which permits the use of heavy duty anti-friction bearings thus effecting a further saving in power as compared with prior constructions in which, owing to the limitations in dimensions of the main drive pinion and the main driving shaft upon which it was mounted, it was impracticable to employ anti-friction bearings, or even bearings of other types having a really satisfactory factor of safety. Further, it is to be noted that the weight of the clutch housing and of the outer friction discs and of the actuating mechanism carried by the clutch housing, is carried largely by the driven shaft 34 which is in movement only a part of the time, rather than by the main driving shaft which is in continuous rotation. A further saving in power is thus effected.

In addition the driven shaft 34, and the clutch and other parts carried thereby, tends to come to rest almost immediately upon being disconnected from the driving shaft 33. That is, as the mechanism is operated to disconnect the clutch discs from each other, and at the same tighten the brake band 75, the shaft 34 and the parts operated in unison with it tend to come to rest almost simultaneously with the operation of the brakes. As a result there is substantially no heating or wearing of the bearings due to the pull of the brake band during the time during which the plunger 25 remains at rest between operating strokes.

The arrangement by which the main portion of the clutch housing together with the friction discs and actuating mechanism may be removed as a unit with the driving shaft 33 is one that has many advantages, since it permits the clutch and main driving shaft to be readily lifted from the press and lowered to the floor for inspection or repair. In this connection it is to be noted that since the brake band 75 cooperates primarily with that portion of the clutch housing which constitutes the disc or end wall 52, rigid with the driven shaft 34, the removal of the clutch housing and the main driving shaft 33 does not necessitate the disassembly of the brake mechanism nor necessitate any readjustment of the same after the clutch housing and the main driving shaft are returned to their position in the press.

A further advantage of the present invention is to be found in the improved means for lubricating the bearing 53 between the main driving shaft 33 and the driven shaft 34. Adequate lubrication may be maintained for bearing 53 by greasing through conduit 77 only at infrequent intervals, say four or five times a year, as compared with the necessity of continually pumping oil to the bearings of prior constructions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:—

1. In a press, comprising a press frame having a pair of sides for guiding a plunger, and a plunger mounted in said frame; means for actuating said plunger, said means comprising a power shaft journaled for rotation at one side of the press frame, said power shaft having a bearing at its inner end, a bearing carried at the other side of the press frame, a second power shaft in extension of the first mentioned power shaft journaled for rotation in the bearing at the inner end of first-mentioned power shaft and in the bearing carried at said other side of the press frame, and a clutch carried by said power shafts adapted to connect said power shafts.

2. In a press, comprising a press frame, and a plunger mounted in said frame; means for actuating said plunger, said means comprising a rotary driven member, a rotary driving member in axial extension of said driven member, means for supporting one of said members from the press frame, means for supporting the other member at one end from the press frame and at the other end from said first mentioned member, and clutch means for connecting said driving and said driven members.

3. In a press, comprising a press frame, and a plunger mounted in said frame; means for actuating said plunger, said means comprising a driven member journaled for rotation upon said press frame, a drive pinion fixed to said driven member, a driving member separately journaled for rotation upon said press frame, and upon said driven member, a clutch adapted to connect said driving and driven members and a band brake cooperating with the driven part of the clutch.

4. In a press, comprising a press frame; means and a plunger mounted in said frame; means for actuating said plunger, said means comprising a driven shaft, spaced-apart bearings for said driven shaft, a drive pinion secured to said driven shaft intermediate said bearings, a driving shaft in axial extension of said driven shaft, said driving shaft having bearing at one end upon the end of the driven shaft, and clutch means carried by said shafts adapted to connect the same.

5. In a press, comprising a press frame, and a plunger mounted in said frame; means for actuating said plunger, said means comprising a driven shaft journaled for rotation at one side of the press frame, a driving shaft journaled for rotation at the other side of the press frame and upon one end of the driven member, a clutch housing having a drum portion and end walls associated with said shafts and friction discs within said housing, said clutch housing being so constructed and arranged that the drum portion, one end wall and the friction-discs may be removed as a unit with said driving shaft.

6. In a press, comprising a press frame, and a plunger mounted in said frame; means for actuating said plunger, said means comprising a driven shaft journaled for rotation at one side of the press frame, a driving shaft journaled for rotation at the other side of the press frame and upon one end of the driven member, a clutch housing having a drum portion and end walls associated with said shafts, friction discs mounted within the housing, and friction disc operating mechanism carried adjacent one end wall of the housing, said housing being so constructed and arranged that the drum portion, one end wall, the friction discs, and operating mechanism may be removed as a unit with said driving shaft.

7. In a press, comprising a press frame, and a plunger mounted in said frame; means for actuating said plunger, said means comprising a driven shaft journaled for rotation at one side of the press frame, a driving shaft journaled for rotation at the other side of said press frame and upon one end of the driven member, a clutch associated with said shafts and comprising friction-discs and operating mechanism therefor, and a fly wheel carried by the driving member, said fly wheel and said friction discs and operating mechanism being unitary with the driving shaft and removable and a unit therewith.

8. In a press, comprising a press frame, and a plunger mounted in said frame; means for actuating said plunger, said means comprising a power shaft journaled for rotation at one side of the press frame, a second power shaft in axial extension of the first mentioned power shaft, a bearing carried at the other side of the press frame for said second power shaft, a recess formed in the inner end of the first mentioned power shaft to provide a bearing for the second mentioned power shaft, clutch means associated with said power shafts for connecting the same, and means carried by one of said power shafts for introducing a lubricant into said bearing recess.

9. In a press, comprising a press frame, and a plunger mounted in said frame; means for actuating said plunger, said means comprising a power shaft journaled for rotation at one side of the press frame, a second power shaft in axial extension of the first mentioned power shaft, a bearing carried at the other side of the press frame, for said second power shaft, a recess formed in the inner end of the first mentioned power shaft to provide a bearing for the second mentioned power shaft, clutch means associated with said power shafts for connecting the same, said first mentioned power shaft having an aperture extending longitudinally therethrough for introducing a lubricant to said bearing recess.

10. In a press, comprising a press frame, and a plunger mounted in said frame; means for actuating said plunger, said means comprising first and second power shafts in axial extension of one another, bearings for supporting each of said power shafts from the press frame, bearing means carried by said shafts at their adjacent ends for supporting the end of the second power shaft from the first power shaft, clutch means associated with said power shafts for connecting the same, and means for introducing a lubricant to said bearing means.

11. In a press, comprising a press frame, and a plunger mounted in said frame; means for actuating said plunger, said means comprising a main driving shaft journaled in one side of said frame, a main drive pinion journaled for rotation in the other side of said frame beyond the end of the main driving shaft, and clutch means for connecting said driving shaft and said drive pinion.

12. In a press, comprising a press frame having a pair of sides for guiding a plunger, and a plunger mounted in said frame; means for actuating said plunger, said means comprising a main driving shaft journaled in one of said sides, a main drive pinion not supported upon said main drive shaft but adapted to be connected in driving connection therewith, and clutch means for connecting said main driving shaft and said main drive pinion.

13. In a press, comprising a press frame, and a plunger mounted in said frame; means for actuating said plunger, said means including a continuously rotating main driving shaft, a drive pinion adapted to be driven from said main driving shaft, a clutch for connecting said driving shaft and said drive pinion said clutch including a separable clutch housing a portion of which is rigidly connected with said main drive pinion, and brake means cooperating with that portion of the clutch housing rigidly connected with the main drive pinion.

14. Press driving means of the class described comprising a drive shaft, drive means therefor, bearing means for said drive shaft, a second shaft in alignment therewith, bearing means for said second shaft, a drive pinion on said second shaft, and a bearing between the adjacent ends of said shafts for supporting one of said shafts on the other, driven clutch means on said second shaft, driving clutch means on said drive shaft, and brake means engageable with said driven clutch means, said drive shaft being removable from its bearing means without disturbing said second shaft in its bearing and without disturbing said brake means.

15. Press driving means of the class described comprising a press frame, a drive shaft, a fly-wheel and a driving gear on said drive shaft, bearing means at one side of said press frame for said drive shaft, a second shaft in continuation of said drive shaft, a drive pinion thereon, bearing means at the other side of said press frame for said second shaft adjacent said drive pinion, and a bearing between the adjacent ends of said shafts for supporting one of said shafts on the other, driven clutch means on said second shaft, driving clutch means on said drive shaft, said clutch means being provided within the confines of the frame, and brake means engageable with said driven clutch means, said drive shaft being removable from its bearing means without disturbing said second shaft and said brake means.

16. Press driving means of the class described comprising a press frame, a drive shaft, a fly-wheel and a driving gear on said drive shaft, bearing means at one side of said press frame for said drive shaft, a second shaft in continuation of said drive shaft, said shafts extending from one side of said press frame to the other, a drive pinion on said second shaft, a pair of bearings for said second shaft one on each side of said drive pinion and both supported on the side of the frame opposite said mentioned bearing means, and a bearing between the adjacent ends of said shafts for supporting one of said shafts on the other, driven clutch means on said second shaft, driving clutch means on said drive shaft, said clutch means being provided within the confines of the frame, and brake means engageable with said driven clutch means, said drive shaft being removable from its bearing means without disturbing said second shaft and said brake means.

17. A press comprising a press frame having a pair of sides guiding a plunger, means for actuating said plunger comprising a drive shaft, a driving gear on said shaft, a second shaft in continuation of said drive shaft, said drive shaft and said second shaft extending substantially across the press frame from one of its said sides to the other, bearings supported by the press sides, one for each of said shafts, a bearing between the adjacent ends of said shafts for supporting one of said shafts on the other, driven clutch means on said second shaft, driving clutch means on said drive shaft, and a band brake engageable with said driven clutch means, said drive shaft being removable from its bearing in the press frame without necessitating the removal of said second shaft and without disturbing said band brake.

18. A press comprising a press frame having a pair of sides guiding a plunger, means for actuating said plunger comprising a drive shaft, a driving gear on said shaft, a second shaft in continuation of said drive shaft, said drive shaft and said second shaft extending substantially across the press frame from one of its said sides to the other, bearings supported by the press sides, one for each of said shafts, a bearing between the adjacent ends of said shafts for supporting one of said shafts on the other, driven clutch means on said second shaft, driving clutch means on said drive shaft, a clutch housing having one portion rigid with said second shaft and a second portion detachably connected to said one portion and in which the drive shaft may rotate, and a band brake engageable with said one portion, said drive shaft being removable from the press frame without necessitating the removal of said second shaft.

In testimony whereof I hereto affix my signature.

ARTHUR A. BYERLEIN.